(12) United States Patent
Jacksteit

(10) Patent No.: US 12,078,275 B2
(45) Date of Patent: Sep. 3, 2024

(54) DEVICE FOR CODING A FIRST CONNECTION PARTNER AND A SECOND CONNECTION PARTNER OF A BAYONET LOCK, AND DEVICE SET

(71) Applicant: NORMA Germany GmbH, Maintal (DE)

(72) Inventor: Bruno Jacksteit, Maintal (DE)

(73) Assignee: Norma Germany GmbH, Maintal (DE)

( * ) Notice: Subject to any disclaimer, the term of this patent is extended or adjusted under 35 U.S.C. 154(b) by 6 days.

(21) Appl. No.: 17/907,805

(22) PCT Filed: Feb. 4, 2021

(86) PCT No.: PCT/EP2021/052644
§ 371 (c)(1),
(2) Date: Aug. 29, 2022

(87) PCT Pub. No.: WO2021/170363
PCT Pub. Date: Sep. 2, 2021

(65) Prior Publication Data
US 2023/0134783 A1 May 4, 2023

(30) Foreign Application Priority Data
Feb. 28, 2020 (DE) ...................... 10 2020 105 395.9

(51) Int. Cl.
*F16L 37/252* (2006.01)
(52) U.S. Cl.
CPC ......... *F16L 37/252* (2013.01); *F16L 2201/10* (2013.01)
(58) Field of Classification Search
CPC ....... F16L 37/24; F16L 37/244; F16L 37/248; F16L 37/252; F16L 37/107
(Continued)

(56) References Cited

U.S. PATENT DOCUMENTS

| 4,449,737 A | 5/1984 | Specht |
| 7,399,000 B2 * | 7/2008 | Lee .......................... A47L 9/242 285/402 |

(Continued)

FOREIGN PATENT DOCUMENTS

| CN | 105792882 A | 7/2016 |
| DE | 4110676 A1 | 10/1992 |

(Continued)

OTHER PUBLICATIONS

Japanese Office Action for Japanese Application No. 2022-548544 dated Sep. 26, 2023 (6 pages).

(Continued)

*Primary Examiner* — Aaron M Dunwoody
(74) *Attorney, Agent, or Firm* — REISING ETHINGTON, P.C.

(57) ABSTRACT

An apparatus for coding a first connection partner and a second connection partner of a bayonet lock. The first connection partner has at least two locking arms for locking the connection and is arranged on a fluid line adapter. The second connection partner has a flange ring for guiding through the first locking partner with a number of recesses which corresponds to the number of locking arms for guiding through the locking arms and is arranged on an adapter receiving member. A first locking arm has a different geometry from the other locking arms. A first recess which is associated with the first locking arm has a compatible geometry for positioning the first connection partner and the second connection partner in a predefined position, and the additional recesses have a different geometry which is not compatible with the first locking arm. The apparatus further has a mechanical coding device.

12 Claims, 3 Drawing Sheets

(58) Field of Classification Search
USPC .................................. 285/914, 402, 361, 396
See application file for complete search history.

(56) References Cited

U.S. PATENT DOCUMENTS

| | | |
|---|---|---|
| 10,238,855 B2 | 3/2019 | Weber et al. |
| 2016/0245443 A1 | 8/2016 | Zonneveld et al. |

FOREIGN PATENT DOCUMENTS

| | | |
|---|---|---|
| DE | 102013018639 A1 | 7/2014 |
| DE | 102016223355 A1 | 8/2017 |
| JP | 3143147 U | 7/2008 |
| JP | 2016540545 A | 12/2016 |
| WO | WO2009024807 A1 | 2/2009 |

OTHER PUBLICATIONS

English Translation of Japanese Office Action for Japanese Application No. 2022-548544 dated Sep. 26, 2023 (8 pages).
European Office Action for European Application No. 21 706 177.9 dated Sep. 14, 2023 (6 pages).
German Office Action for German Application No. 10 2020 105 395.9 dated Dec. 9, 2020 (6 pages).
International Search Report for International Application No. PCT/EP2021/052644 dated May 6, 2021 (3 pages).
English Translation of International Search Report for International Application No. PCT/EP2021/052644 dated May 6, 2021 (2 pages).
Chinese Office Action for Chinese Application No. 202180007411.1 dated Jun. 17, 2024 (8 pages).

\* cited by examiner

DEVICE FOR CODING A FIRST CONNECTION PARTNER AND A SECOND CONNECTION PARTNER OF A BAYONET LOCK, AND DEVICE SET

INTRODUCTION

The disclosure relates to an apparatus for coding a first connection partner and a second connection partner of a bayonet lock and an apparatus set.

BACKGROUND

In order to transport fluids between different containers in an apparatus, for example, cooling units, fluid lines are used. These fluid lines may in this instance be connected by means of fluid line adapters, for example, to distributor plates which supply the fluid supplied via the fluid line to different and where applicable a plurality of additional fluid lines. If a large number of fluid lines are used, these must not be confused in order to obtain the function of the apparatus and to prevent damage.

To this end, the fluid lines and the corresponding receiving members of the fluid lines can be coded with symbols which associate a fluid line with a receiving member. A user must accordingly, prior to the assembly of the fluid lines, associate the symbols on the fluid line with the corresponding symbols on the receiving members of the fluid lines.

BRIEF SUMMARY OF THE DISCLOSURE

An object according to an embodiment of the disclosure is therefore to provide an improved apparatus for coding the lines which can be handled in a more effective manner.

In an apparatus for coding a first connection partner and a second connection partner of a bayonet lock, per an embodiment, wherein the first connection partner has at least two locking arms for locking the connection and is arranged on a fluid line adapter and wherein the second connection partner has a flange ring for guiding through the first locking partner with a number of recesses which corresponds to the number of locking arms for guiding through the locking arms and is arranged on an adapter receiving member, there is provision according to the embodiment for a first locking arm to have a different geometry from the other locking arms, wherein a first recess which is associated with the first locking arm has a compatible geometry for positioning the first connection partner and the second connection partner in a predefined position, and the additional recesses have a different geometry which is not compatible with the first locking arm, and wherein the apparatus further has a mechanical coding device, wherein the coding device has a first coding partner on the first connection partner and a second coding partner on the second connection partner, wherein the first coding partner and the second coding partner are orientated in a mutually compatible manner when the first connection partner and the second connection partner are arranged in a predefined position with respect to each other and a connection is brought about by means of the bayonet lock.

With the apparatus according to an embodiment, using the mechanical coding device a clear association between the first connection partner and the second connection partner of a bayonet lock which connects a fluid line adapter to an adapter receiving member can be provided. The bayonet lock has in this instance at least two locking arms which are arranged on the first connection partner. Furthermore, the bayonet lock comprises on the second connection partner a flange ring which has recesses. The number of recesses is in this instance equal to the number of locking arms. The locking arms are arranged when viewed in an axial direction of the apparatus in a star-like manner around an end piece of the fluid line adapter. The same applies to the recesses on the flange ring which has an inner annular diameter which enables the end piece of the fluid line adapter to be guided through. At the position of the recesses, the inner annular diameter of the flange ring is increased, wherein the locking arms can be guided at the position of the recesses through the flange ring. In order to connect the bayonet lock, the first connection partner is connected to the second connection partner, wherein the locking arms are guided through the recesses of the flange ring. Since the locking arms and the recesses, as a result of their geometries, bring about a positioning of the connection partners with respect to each other, the first and second connection partners can be connected to each other only in one predefined position. Furthermore, the mechanical coding device comprises a first coding partner which mechanically cooperates with a second coding partner, in which the two coding partners are constructed to be mutually compatible. Using the mechanical coding device, an automatic association between the first connection partner and second connection partner is brought about when the bayonet lock is connected. A first connection partner, which is not intended to be associated with a second connection partner, has a first coding partner which is not orientated to be compatible with the second coding partner. A connection between the first connection partner and the second connection partner, as a result of the first and second connection partners which are incompatible in this instance, is not possible since the connection partners can be orientated with respect to each other only in the predefined position. When the first connection partner is intended to be associated with the second connection partner, the first connection partner has a first coding partner which in the predefined position is orientated to be compatible with the second coding partner.

Alternatively or additionally, per embodiments, the first recess may, for example, have a geometry which differs from the standard geometry of the recesses, wherein the corresponding first locking arm has a compatible complementary geometry. In this instance, for example, either only the corresponding locking arm can be guided through this recess or, alternatively, the corresponding locking arm can be guided through none of the other recesses. Consequently, in combination with the mechanical coding device, a mechanical association is brought about between the two connection partners without significant complexity.

A user in this instance no longer has to decode a symbol and connect it to another symbol when he wishes to associate the fluid line adapter with the corresponding receiving member. Consequently, incorrect association of the fluid lines which are connected to the fluid line adapters and the adapter arm receiving members is prevented. This increases the effectiveness of the handling of the apparatus.

For example, the first locking arm may have a greater extent in a circumferential direction of the bayonet lock than the other locking arms, wherein the first recess has a compatible extent in a circumferential direction and the additional recesses in the circumferential direction have a smaller extent which is not compatible with the first locking arm.

In this example, one of the locking arms, that is to say, the first locking arm, comprises in the circumferential direction a greater extent than the other locking arms and therefore cannot be guided through the recesses which are compatible with the other locking arms. The first locking arm is too large for this. Consequently, the first connection partner can only be connected to the second connection partner in a position in which the first locking arm is in alignment with the first recess in order to lock the bayonet lock. Consequently, on the one hand, the first connection partner is associated with the second connection partner. On the other hand, without significant complexity, a predefined positioning of the two connection partners with respect to each other is thereby brought about.

Furthermore, the first coding partner may, for example, be a projection and the second coding partner may be a recess.

In this instance, the projection is compatible with the recess, that is to say, the projection can be introduced into the recess and moved therein when the bayonet lock is intended to be locked. The projection can be introduced into the recess only in one predefined position of the first connection partner with respect to the second connection partner. Consequently, the first connection partner is associated with the second connection partner.

According to one example embodiment, the projection may extend in a radial direction of the fluid line adapter away from the first connection partner, wherein the second connection partner has an edge which extends in a circumferential direction of the adapter receiving member and which has a guide which extends in a circumferential direction for the projection.

The projection protrudes in this example outwardly in a radial direction away from the first connection partner and consequently away from the fluid line adapter. The edge surrounds in this instance the first connection partner when the first connection partner is arranged on the second connection partner and is connected thereto. The projection may in this instance be arranged in the guide and be moved in a circumferential direction along the guide when the bayonet lock is locked.

In another example, the projection may extend in an axial direction of the fluid line adapter away from the fluid line adapter, wherein the second connection partner has a guide which extends in a circumferential direction of the adapter receiving member for the projection.

In this example, in a connection of the first connection partner to the second connection partner, the projection is arranged in a guide which is arranged within the adapter receiving member. When the bayonet lock is closed, the projection can be moved along the guide in a circumferential direction.

In this instance, the second coding partner may, for example, have a stop element which in a locking position of the apparatus forms a positive-locking connection with the projection in a circumferential direction.

Via the stop, it is indicated to a user that the first connection partner and the second connection partner are mounted and locked in the correct position.

According to another example embodiment, the first connection partner may have three locking arms.

However, it is not thereby excluded that the first locking partner may have a greater or smaller number of locking arms. Furthermore, the second connection partner accordingly comprises three recesses, through which the locking arms can be guided.

The disclosure further relates, per an embodiment, to an apparatus set comprising a large number of apparatuses according to the preceding description, wherein each of the large number of apparatuses has a coding device which for clear identification of an apparatus differs from the coding devices of the others of the large number of apparatuses.

As a result of the differing coding devices of the individual apparatuses from the apparatus set, the individual apparatuses have first connection partners and second connection partners which cannot be used with each other when they originate from different apparatuses. Consequently, a risk of confusion between the individual apparatuses of the large number of apparatuses can be prevented. Furthermore, when the individual apparatuses are mounted, an automatic identification of the correct pairing between the first connection partner and the second connection partner can be provided by enabling the connection between the first connection partner and the second connection partner.

In one example, when the fluid line adapters of the large number of apparatuses each have a fluid line curvature, each of the large number of apparatuses may have an individual angular relationship between the respective coding device and the respective fluid line curvature.

Since the fluid line curvature in the assembly situation must face in a specific direction, the angular relationship which is specific to the respective apparatus between the coding device and the fluid line curvature brings about a correct positioning of the fluid line curvature of the fluid line adapter in the connection between the first connection partner and the second connection partner. This simplifies the assembly of the apparatus or the fluid line adapter on the adapter receiving member.

According to another example embodiment, the first coding partner of one of the large number of apparatuses and the second coding partner of another of the large number of apparatuses may be incompatible.

As a result of the incompatibility between the first coding partner of one of the large number of apparatuses and the second coding partner of another of the large number of apparatuses, confusion of the connection partners of different apparatuses of the apparatus set is prevented.

Other features, details and advantages of the disclosure will be appreciated from the wording of the claims and from the following description of embodiments with reference to the drawings, in which:

DETAILED DESCRIPTION

Figure 1:
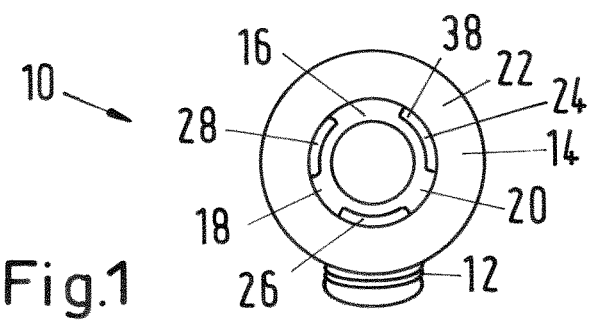
FIG. 1 shows a schematic illustration of an apparatus as a first view in an axial direction.

The apparatus according to an embodiment is, as illustrated in FIG. 1, designated 10 in its entirety.

The apparatus 10 comprises in this instance a fluid line adapter which has a first connection partner 12 and an adapter receiving member which has a second connection partner 14. The first connection partner 12 and the second connection partner 14 may be connected to each other in order to connect the fluid line adapter to the adapter receiving member. This assembly state is illustrated in FIG. 1.

Figure 2A:
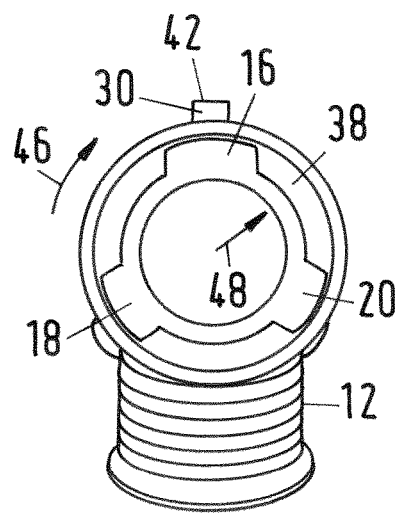
FIGS. 2a, b show a schematic illustration of the fluid line adapter with the first connection partner and the adapter receiving member with the second connection partner.

As illustrated in FIG. 2a, the first connection partner 12 comprises at least two locking arms 16, 18, 20 which are arranged in the form of a star in an end piece of the fluid line adapter. The locking arms 16, 18, 20 extend in this instance in a radial direction 48 of the fluid line adapter and face away from the fluid line adapter. In this example, three locking arms 16, 18, 20 are provided.

Furthermore, the locking arms 16, 18, 20 extend in a circumferential direction 46 of the fluid line adapter. In this example, the extent of the locking arm 16 in a circumferential direction 46 is greater than the extent of the other locking arms 18, 20. The locking arm 16 can be referred to as the first locking arm 16.

Figure 2B:
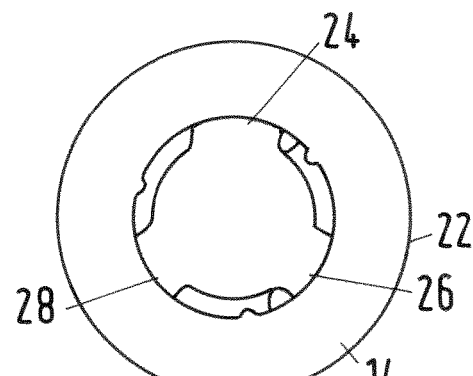

According to FIG. 2b, the second connection partner 14 has a flange ring 22. The flange ring 22 has along the inner circumference thereof recesses 24, 26, 28 which are constructed to be compatible with the locking arms 16, 18, 20. That is to say, the locking arms 16, 18, 20 can be guided through at least one of the recesses 24, 26, 28 when they are in alignment therewith. In this instance, however, the recesses 26 and 28 have a smaller extent in the circumferential direction 46 than the first locking arm 16. The first locking arm 16 consequently cannot be guided through the recesses 26 and 28. Only the recess 24 which can be referred to as the first recess 24 has a geometry in a circumferential direction 46 which enables the first locking arm 16 to be guided through. The first locking arm 16 can therefore be guided only through the first recess 24. A connection between the first connection partner 12 and the second connection partner 14 is therefore possible only in one predefined position.

The fluid line adapter may further have a sealing element 38 in the form of an O-ring. The sealing element 38 seals a connection between the first connection partner 12 and the second connection partner 14 when the locking arms 16, 18, 20 have been guided through the recesses 24, 26, 28.

Figure 3:
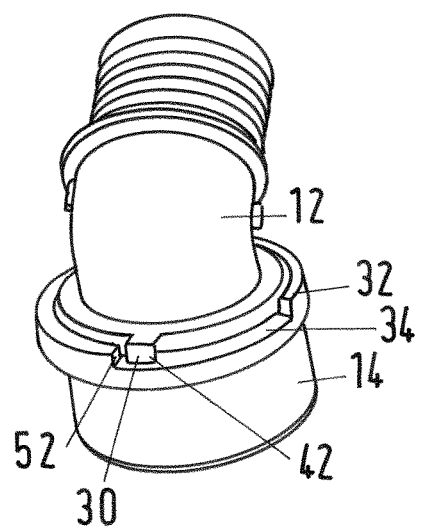
FIG. 3 shows a schematic illustration of another view of the apparatus as a second view.

FIG. 3 shows another view of the apparatus 10. The mechanical coding device comprises as the first coding partner 42 in this example a projection 30 which extends in a radial direction away from the first connection partner 12.

The adapter receiving member which acts as a second connection partner 14 comprises a guide 34 which is arranged at an edge 32 and which acts as a second marking partner 44. The guide 34 may be formed as a recess of the edge 32 in the circumferential direction.

Furthermore, the second connection partner 14 comprises a stop 52 in which, in an assembly position of the apparatus 10, the projection 30 is prevented from further rotation in a circumferential direction by means of a positive-locking connection. When the projection 30 is arranged on the stop 52, it is thereby indicated that a correct connection between the first connection partner 12 and the second connection partner 14 has been produced. A user can with reference to the projection 30 identify whether the first connection partner 12 and the second connection partner 14 have been correctly connected to each other and locked.

Figure 4A:
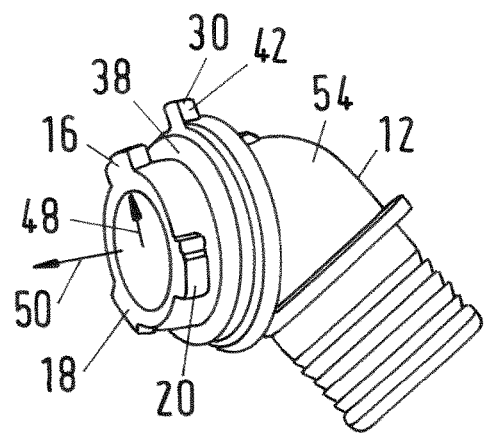
FIGS. 4a, b show a schematic illustration of the fluid line adapter with the first connection partner and the adapter receiving member with the second connection partner according to the other embodiment.

FIG. 4a illustrates the first connection partner 12 of this example from another view. The first connection partner 12 also comprises three locking arms 16, 18, 20 in this instance. The projection 30 is arranged with spacing in an axial direction 50 from the end piece of the fluid line adapter. The sealing element 38 is arranged between the projection 30 and the locking arms 16, 18, 20.

The fluid line adapter further has a fluid line curvature 54 so that the two end pieces of the fluid line adapter are arranged at an angle with respect to each other. The projection 30 is in this instance arranged between the fluid line curvature 54 and the locking arms 16, 18, 20.

In this instance, the connection partner 12 between the projection 30 which acts as a first coding partner 42 and the fluid line curvature 54 has a predefined angular relationship. This angular relationship determines in this instance the direction, with respect to the adapter receiving member on which the second connection partner 14 is arranged, in which the fluid line curvature 54 extends after the assembly.

Figure 4B:
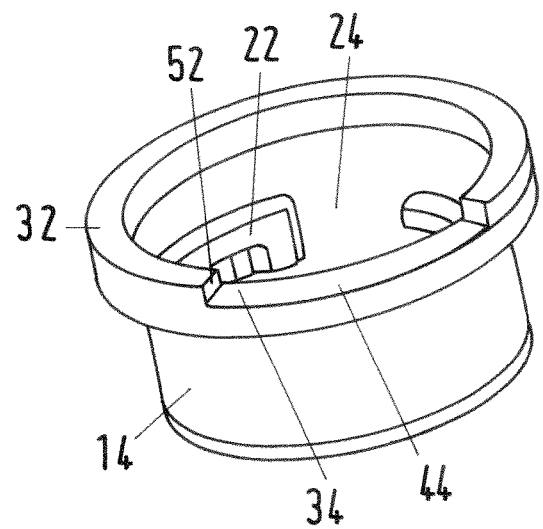

In this instance, FIG. 4b illustrates the adapter receiving member of this example. The adapter receiving member which acts as a second connection partner 14 also comprises a flange ring 22 with recesses 24, 26, 28. Only the recess 24 is visible in this Figure. As a result of the cooperation of the first coding partner 42 and the second coding partner 44, which is in the form of a guide 34 on the edge 32, with the predefined position which is brought about by the locking arms 16, 18, 20 and the recesses 24, 26, 28, a fixed association between the connection partners 12, 14 is provided. Consequently, the direction of the fluid line curvature 34 in the assembly position with respect to the adapter receiving member is also determined.

Figure 5A:
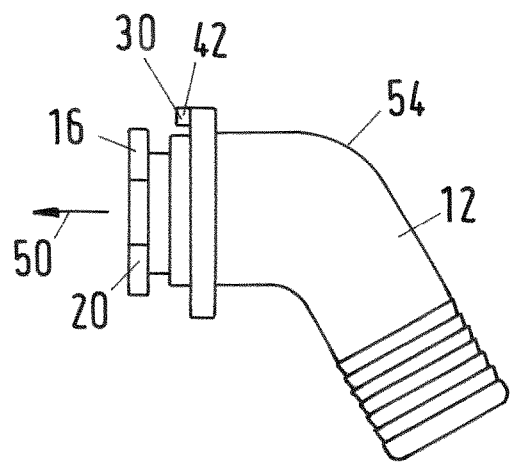
FIGS. 5a, b, show a schematic illustration of another example of the apparatus.
Figure 5B:
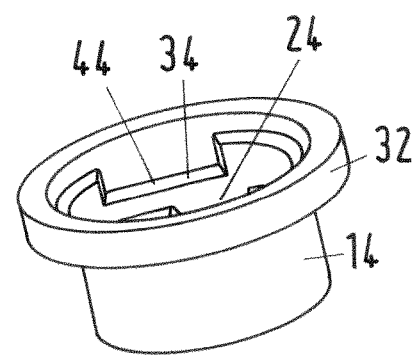

According to another example of the apparatus 10 according to FIGS. 5a and 5b, the apparatus 30 can also be orientated in an axial direction 50. This is illustrated in FIG. 5a, which shows the first connection partner 12.

FIG. 5b shows the second connection partner 14, which depicts a correspondingly constructed guide 34 as a second coding partner 44. The guide 34 is in this example arranged inside the adapter receiving member.

Figure 6A:
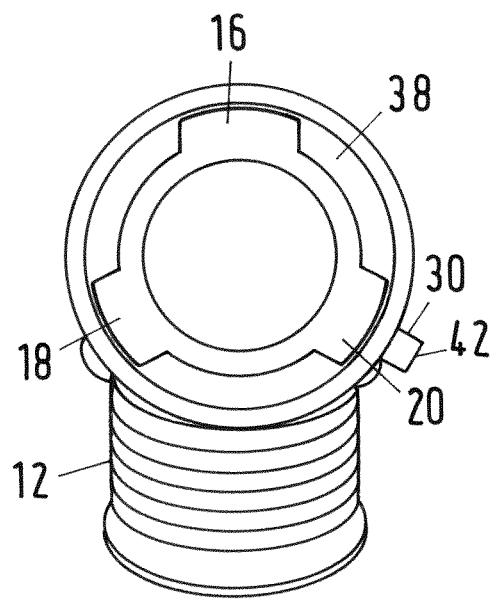
FIGS. 6a, b show schematic illustrations of apparatuses of an apparatus set.
Figure 6B:
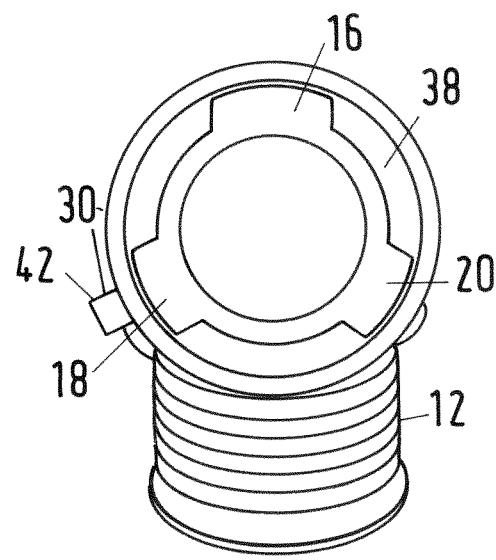

FIGS. 6a and 6b show the first connection partners 12 of apparatuses 10 of an apparatus set which has a large number of apparatuses 10. The apparatuses 10 have in this instance mechanical coding devices which differ between the various apparatuses 10.

In this regard, in FIG. 6a, the first coding partner 42 is arranged at the bottom right in the Figure as a projection 30.

In FIG. 6b, the first coding partner 42 is arranged at the bottom left in the drawing as a projection 30.

FIG. 2a shows in this regard another apparatus 10 of the apparatus set in which the first coding partner 42 is arranged at the top in the Figure as a projection 30.

As a result of the different first coding partners 42 of the apparatus 10, the first and second connection partners 12, 14 can clearly be associated with each other. Consequently, confusion of different connection partners 12, 14 which belong to different apparatuses 10 is prevented.

Figure 7:
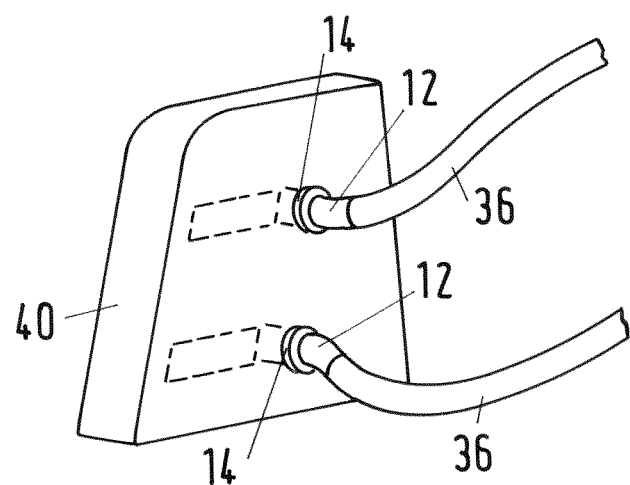
FIG. 7 shows a schematic illustration of a system comprising a distributor plate and fluid lines which are connected to the apparatus.

FIG. 7 shows a distributor plate 40 for fluid lines and fluid lines 36 which are connected thereto by means of apparatuses 10. The fluid lines 36 are in this instance connected to the fluid line adapters, that is to say, the first connection partners 12. The distributor plate 40 has the adapter receiving members, that is to say, the second connection partners 14. The first connection partners 12 are associated in a clear manner with the second connection partners 14 by means of the respective coding devices.

The invention is not limited to one of the embodiments described above but can instead be modified in various manners.

All of the features and advantages derived from the claims, the description and the drawings, including structural details, spatial arrangements and method steps, may be significant to the invention both per se and in extremely varied combinations.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Apparatus
12 First connection partner
14 Second connection partner
16 First locking arm
18 Locking arm
20 Locking arm
22 Flange ring
24 First receiving member
26 Receiving member
28 Receiving member
30 Projection
32 Edge
34 Guide
36 Fluid line
38 Sealing element
40 Distributor plate
42 First coding partner
44 Second coding partner
46 Circumferential direction
48 Radial direction
50 Axial direction
52 Stop
54 Fluid line curvature

The invention claimed is:

1. An apparatus for coding, comprising: a first connection partner and a second connection partner of a bayonet lock, wherein the first connection partner has at least two locking arms for locking the connection and is arranged on a fluid line adapter and wherein the second connection partner has a flange ring for guiding through the first connection partner with a number of recesses which corresponds to the number of locking arms for guiding through the locking arms and is arranged on an adapter receiving member, wherein a first locking arm has a different geometry from the other locking arms, wherein a first recess which is associated with the first locking arm has a compatible geometry for positioning the first connection partner and the second connection partner in a predefined position, and the additional recesses have a different geometry which is not compatible with the first locking arm, and wherein the apparatus further has a mechanical coding device, wherein the mechanical coding device has a first coding partner on the first connection partner and a second coding partner on the second connection partner, wherein the first coding partner and the second coding partner are orientated in a mutually compatible manner when the first connection partner and the second connection partner are arranged in the predefined position with respect to each other and a connection is brought about by means of the bayonet lock, wherein the first locking arm has a greater extent in a circumferential direction of the bayonet lock than the other locking arms, wherein the first recess has a compatible extent in a circumferential direction and the additional recesses in the circumferential direction have a smaller extent which is not compatible with the first locking arm.

2. The apparatus as claimed in claim 1, wherein the first coding partner is a projection and the second coding partner is a guide which is associated with the projection.

3. The apparatus as claimed in claim 2, wherein the projection extends in a radial direction of the fluid line adapter away from the first connection partner, wherein the second connection partner has an edge which extends in a circumferential direction of the adapter receiving member and which has the guide for the projection, wherein the guide extends in a circumferential direction.

4. The apparatus as claimed in claim 2, wherein the projection extends in an axial direction of the fluid line adapter away from the fluid line adapter, wherein the second connection partner has the guide for the projection, wherein the guide extends in a circumferential direction of the adapter receiving member.

5. The apparatus as claimed in claim 1, wherein the second coding partner has a stop element which in a locking position of the apparatus forms a positive-locking connection with the projection in a circumferential direction.

6. The apparatus as claimed in claim 1, wherein the first connection partner has three locking arms.

7. An apparatus set comprising a large number of apparatuses as claimed in claim 1, wherein each of the large number of apparatuses has a coding device which for clear identification of an apparatus differs from the coding devices of the others of the large number of apparatuses.

8. The apparatus set as claimed in claim 7, wherein, when the fluid line adapters of the large number of apparatuses each have a fluid line curvature, each of the large number of apparatuses has an individual angular relationship between the respective coding device and the respective fluid line curvature.

9. The apparatus set as claimed in claim 7, wherein the first coding partner of one of the large number of apparatuses and the second coding partner of another of the large number of apparatuses are incompatible.

10. An apparatus set comprising a large number of apparatuses, wherein each of the apparatuses comprises a first connection partner and a second connection partner of a bayonet lock, wherein the first connection partner has at least two locking arms for locking the connection and is arranged on a fluid line adapter and wherein the second connection partner has a flange ring for guiding through the first connection partner with a number of recesses which corresponds to the number of locking arms for guiding through the locking arms and is arranged on an adapter receiving member, wherein a first locking arm has a different geometry from the other locking arms, wherein a first recess which is associated with the first locking arm has a compatible geometry for positioning the first connection partner and the second connection partner in a predefined position, and the additional recesses have a different geometry which is not compatible with the first locking arm, and wherein the apparatus further has a mechanical coding device, wherein the mechanical coding device has a first coding partner on the first connection partner and a second coding partner on the second connection partner, wherein the first coding partner and the second coding partner are orientated in a mutually compatible manner when the first connection partner and the second connection partner are arranged in the predefined position with respect to each other and a connection is brought about by means of the bayonet lock, and further wherein each of the large number of apparatuses has a coding device which for clear identification of an apparatus differs from the coding devices of the others of the large number of apparatuses.

11. The apparatus set as claimed in claim 10, wherein, when the fluid line adapters of the large number of apparatuses each have a fluid line curvature, each of the large number of apparatuses has an individual angular relationship between the respective coding device and the respective fluid line curvature.

12. The apparatus set as claimed in claim 10, wherein the first coding partner of one of the large number of apparatuses and the second coding partner of another of the large number of apparatuses are incompatible.

\* \* \* \* \*